United States Patent [19]
Lorenz et al.

[11] 3,878,210
[45] Apr. 15, 1975

[54] PYRIDAZINOTHIONOPHOSPHORIC (-PHOSPHONIC) ACID ESTERS

[75] Inventors: Walter Lorenz, Wuppertal-Cronenberg; Ingeborg Hammann, Cologne, both of Germany

[73] Assignee: Bayer Aktiengesellschaft, Leverkusen, Germany

[22] Filed: Sept. 23, 1970

[21] Appl. No.: 74,864

[30] Foreign Application Priority Data
Oct. 7, 1969 Germany............................ 1950491

[52] U.S. Cl............................ 260/250 AP; 424/250
[51] Int. Cl............................................. C07d 51/04
[58] Field of Search..................................... 260/250

[56] References Cited
UNITED STATES PATENTS
3,100,206  8/1963  Rigterink....................... 260/250 A
3,544,572  12/1970  Fest.................................. 260/250 A

*Primary Examiner*—Nicholas S. Rizzo
*Attorney, Agent, or Firm*—Burgess, Dinklage & Sprung

[57] ABSTRACT

Pyridazinothionophosphoric (-phosphonic) acid esters which possess arthropodicidal, especially insecticidal or acaricidal, properties. The compounds have the structure

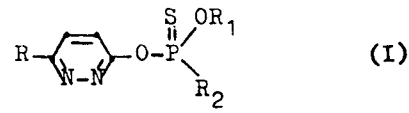

in which
R is a lower alkyl or phenyl radical,
$R_1$ is a branched or straight-chain lower alkyl radical, and
$R_2$ is a branched or straight-chain lower alkoxy or alkyl or phenyl radical.

11 Claims, No Drawings

PYRIDAZINOTHIONOPHOSPHORIC (-PHOSPHONIC) ACID ESTERS

The present invention relates to certain new pyridazinothionophosphoric (-phosphonic) acid esters, to a process for their preparation, and to their use as insecticides or acaricides.

It is known that hydroxypyridazino(thiono)-phosphoric acid esters, such as 0,0-dimethyl- or 0,0-diethyl-0-[6-hydroxypyridazinyl-(3)]-thionophosphoric acid ester, exhibit insecticidal and acaricidal properties (cf. U.S. Pat. No. 2,759,938).

The present invention provides pyridazinothionophosphoric (-phosphonic) acid esters of the formula

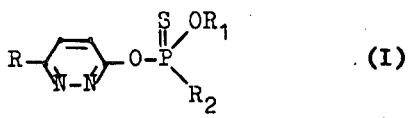 (I)

in which
R is a lower alkyl or phenyl radical,
$R_1$ is a branched or straight-chain lower alkyl radical, and
$R_2$ is a branched or straight-chain lower alkoxy or alkyl or phenyl radical.

These compounds are distinguished by a strong insecticidal and acaricidal activity.

The invention also provides a process for the production of a pyridazinothionophosphoric (-phosphonic) acid ester of the formula (I) in which a thionophosphoric (-phosphonic) acid ester halide of the formula

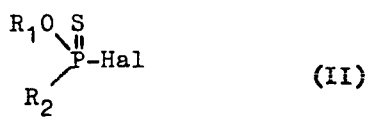 (II)

is reacted with a 6-hydroxypyridazino derivative of the formula

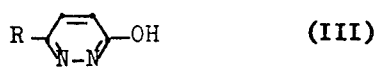 (III)

in which
R, $R_1$ and $R_2$ have the meanings stated above, and
Hal stands for a halogen atom
in the presence of an acid acceptor or in the form of an alkali metal, alkaline earth metal or ammonium salt.

Surprisingly, the pyridazinothionophosphoric (phosphonic) acid esters according to the invention show a considerably stronger insecticidal and acaricidal activity than the known hydroxypyridazino(thiono)-phosphoric acid esters of analogous constitution and the same direction of activity. The substances according to the invention therefore represent a genuine enrichment of the art.

If 3-methyl-6-hydroxypyridazine and 0,0-diethylthionophosphoric acid ester chloride are used as starting materials, the reaction course can be represented by the following formula scheme:

The starting materials to be used are unambiguously defined generally by the formulae (II) and (III).

Advantageously, $R_1$ is a branched or straight-chain alkyl radical with 1 to 4 carbon atoms, such as methyl, n-, iso-, sec.- or tert.-butyl and especially of 2 to 3 carbon atoms such as ethyl, n- or iso-propyl; and $R_2$ is such a radical or alkoxy of 1 to 4 carbon atoms or phenyl, preferably methyl, ethyl, ethoxy, n- or iso-propoxy and, again, phenyl. Hal is preferably a chlorine atom. Preferably, R is a methyl or phenyl radical.

As examples of the thionophosphoric (-phosphonic) acid ester halides which can be used, there are mentioned in particular:

0,0-diethyl-, 0,0-diisopropyl-, 0,0-dibutyl-, 0,0-di-tert.-butyl-, 0-ethyl-0-isopropyl-, 0-ethyl-0-propyl-, 0-ethyl-0-butyl-, 0-isopropyl-0-butyl and 0-propyl-0-butyl-thionophosphoric acid ester chloride or bromide.

0-ethyl-ethane-, 0-propyl-ethane-, 0-isopropyl-ethane-, 0-ethyl-propane- 0-ethyl-isopropane-, 0-ethyl-butane-, 0-isopropyl-propane-, 0-ethyl-benzene-, 0-isopropyl-benzene- and 0-butylbenzene-thionophosphonic acid ester chloride or bromide.

The acid halides and pyridazine derivatives to be used as starting materials are known and can be prepared according to known methods.

The reaction may be carried out in the presence of a solvent which term includes a mere diluent. All inert organic solvents are suitable. These include all aliphatic and aromatic (possibly chlorinated) hydrocarbons, such as benzene, toluene, xylene, benzine, methylene chloride, chloroform, carbon tetrachloride, chlorobenzene; ethers, such as diethyl ether, dibutyl ether, dioxane; ketones, such as acetone, methylethyl ketone, methylisopropyl ketone, methylisobutyl ketone; nitriles, in particular acetonitrile; and the like.

As acid acceptors, all customary acid-binding agents are suitable. Particularly suitable have proved to be alkali metal carbonates and alcoholates, such as sodium and potassium carbonate, methylate or ethylate; aliphatic, aromatic or heterocyclic amines, for example triethylamine, dimethylamine, dimethylaniline, dimethylbenzylamine, pyridine, and the like.

The reaction temperatures can be varied within a fairly wide range. In general, the reaction is carried out at about 10° to 90°C, preferably at 40° to 50°C.

The reaction is, in general, carried out at normal pressure.

When carrying out the process, the starting components may be reacted in equimolar proportion in a suitable solvent at the temperatures stated, optionally in the presence of an acid acceptor. After several hours' stirring of the mixture at elevated temperature, the generally yellow mixture is poured into water, taken up with a hydrocarbon, preferably benzene, and worked up in known manner.

The substances according to the invention are obtained in most cases in the form of colorless to slightly yellow-colored, viscous, water-insoluble oils which cannot be distilled without decomposition but can, by so-called "slight distillation" (prolonged heating at moderately elevated temperatures under reduced pressure), be freed from the last volatile components and

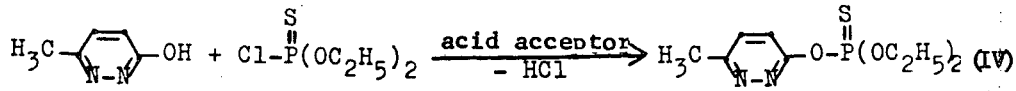

IIIa    IIa      Ia in this way be purified. For their characterization, the refractive index is particularly suitable.

Crystalline substances are characterized by their melting points.

The products according to the invention have, with only slight phytotoxicity, an outstanding insecticidal and acaricidal effectiveness. In addition, some of them are distinguished by a rodenticidal side-effect.

The pesticidal effect sets in rapidly and is long-lasting. By reason of these surprising, technologically valuable properties, the new substances can be used for the control of noxious sucking and biting insects, as well as mites, above all in crop protection.

To the sucking insects there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*); and the like.

Also to be classed with the biting insects are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*blattella germanica*), American cockroach (*Periplaneta americana*), Madeira cockroach (Leucophaea or *Rhyparobia madeirae*), Oriental cockroach (*Blatta orientalis*), the giant cockroach (*Blaberus fuscus*) as well as *Henschoutedenia flexivitta*; further Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius = Tetranycus althaeae* or *Tetranychus urticae*) and the European red mite (*Paratetranychus pilosus = Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing-fever tick (*Ornithodorus moubata*); and the like.

When applied against hygiene pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols, (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commerically marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0005–20%, preferably 0.005–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0005–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

Furthermore, the present invention contemplates methods of selectively killing, combating or controlling pests, e.g. arthropods, i.e. insects and acarids, and more particularly methods of combating at least one of insects and acarids which comprises applying to at least one of correspondingly (a) such insects, (b) such acarids, and (c) the corresponding habitat thereof, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

Surprisingly, the new compounds, compared with the active compounds of analogous constitution and the same direction of activity hitherto known from the literature, are distinguished by a substantially better effectiveness, with considerably lower toxicity to warm-blooded animals. They therefore represent a genuine enrichment of the art. This unexpected superiority, as well as the outstanding activity of the compounds which can be prepared according to the process, is illustrated by the experimental results given in the following examples:

EXAMPLE 1

Plutella test
  Solvent: 3 parts by weight acetone
  Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from Table 1.

Table 1

(Plutella test)

| Active compound (constitution) | Concentration of active compound in % | Degree of destruction in % after 3 days |
|---|---|---|
| (A) $(C_2H_5O)_2\overset{S}{\underset{\|}{P}}-O-\langle\text{pyridazine}\rangle-OH$ (known) | 0.1<br>0.01 | 100<br>0 |
| (2) $(C_2H_5O)_2\overset{S}{\underset{\|}{P}}-O-\langle\text{pyridazine}\rangle-C_6H_5$ | 0.1<br>0.01<br>0.001 | 100<br>100<br>100 |
| (3) $\begin{array}{c}C_2H_5\\C_2H_5O\end{array}\overset{S}{\underset{\|}{P}}-O-\langle\text{pyridazine}\rangle-C_6H_5$ | 0.1<br>0.01 | 100<br>100 |
| (1) $(C_2H_5O)_2\overset{S}{\underset{\|}{P}}-O-\langle\text{pyridazine}\rangle-CH_3$ | 0.1<br>0.01<br>0.001 | 100<br>100<br>90 |

EXAMPLE 2

Phaedon larvae test
Solvent: 3 parts by weight acetone
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compounds, the times of evaluation and the results can be seen from Table 2.

Table 2

(Phaedon larvae test)

| Active compound (constitution) | Concentration of active compound in % | Degree of destruction in % after 3 days |
|---|---|---|
| (B) $(CH_3O)_2\overset{S}{\underset{\|}{P}}-O-\langle\text{pyridazine}\rangle-OH$ (known) | 0.01<br>0.001 | 100<br>0 |

Table 2 — Continued

(Phaedon larvae test)

| Active compound (constitution) | Concentration of active compound in % | Degree of destruction in % after 3 days |
| --- | --- | --- |
| (A) $(C_2H_5O)_2\overset{S}{\underset{\|}{P}}-O-\underset{N-N}{\langle\;\rangle}-OH$ (known) | 0.01<br>0.001 | 100<br>0 |
| (2) $(C_2H_5O)_2\overset{S}{\underset{\|}{P}}-O-\underset{N-N}{\langle\;\rangle}-\langle\;\rangle$ | 0.01<br>0.001 | 100<br>100 |
| (3) $\underset{C_2H_5O}{\overset{C_2H_5}{>}}\overset{S}{\underset{\|}{P}}-O-\underset{N-N}{\langle\;\rangle}-\langle\;\rangle$ | 0.01<br>0.001 | 100<br>100 |
| (1) $(C_2H_5O)_2\overset{S}{\underset{\|}{P}}-O-\underset{N-N}{\langle\;\rangle}-CH_3$ | 0.01<br>0.001 | 100<br>100 |

EXAMPLE 3

Myzus test (contact action)
  Solvent: 3 parts by weight acetone
  Emulsifier: 1 part by weight alkylaryl polyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3.

Table 3

(Myzus test)

| Active compound (constitution) | Concentration of active compound in % | Degree of destruction in % after 24 hours |
|---|---|---|
| (A) $(C_2H_5O)_2\overset{S}{\underset{\|}{P}}-O-\underset{N-N}{\bigcirc}-OH$ (known) | 0.1<br>0.01<br>0.001<br>0.0001 | 100<br>98<br>40<br>0 |
| (3) $\begin{array}{c}C_2H_5\\C_2H_5O\end{array}\overset{S}{\underset{\|}{P}}-O-\underset{N-N}{\bigcirc}-\bigcirc$ | 0.1<br>0.01<br>0.001 | 100<br>99<br>80 |
| (1) $(C_2H_5O)_2\overset{S}{\underset{\|}{P}}-O-\underset{N-N}{\bigcirc}-CH_3$ | 0.1<br>0.01<br>0.001 | 100<br>100<br>90 |
| (4) $(iC_3H_7O)_2\overset{S}{\underset{\|}{P}}-O-\underset{N-N}{\bigcirc}-CH_3$ | 0.1<br>0.01<br>0.001 | 100<br>100<br>55 |
| (5) $\begin{array}{c}C_2H_5\\C_2H_5O\end{array}\overset{S}{\underset{\|}{P}}-O-\underset{N-N}{\bigcirc}-CH_3$ | 0.1<br>0.01<br>0.001<br>0.0001 | 100<br>100<br>100<br>70 |

EXAMPLE 4

Tetranychus test

Solvent: 3 parts by weight acetone

Emulsifier: 1 part by weight alkylaryl polyglycol ether

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4.

Table 4
(Tetranychus test)
| Active compound (constitution) | Concentration of active compound in % | Degree of destruction in % after 48 hours |
|---|---|---|
| (B) 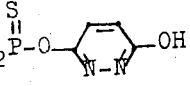 (known) | 0.1<br>0.01 | 98<br>0 |
| (A) 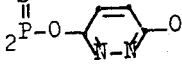 (known) | 0.1<br>0.01 | 95<br>0 |
| (2) 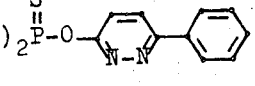 | 0.1<br>0.01 | 100<br>40 |
| (1) 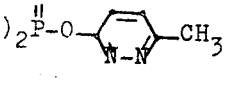 | 0.1<br>0.01 | 100<br>40 |
| (5)  | 0.1<br>0.01 | 100<br>90 |

EXAMPLE 5

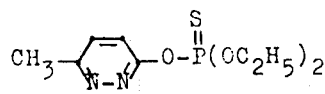 (1)

48.5 g (0.48 mole) 3-methylpyridazone-(6) [prepared according to O. Poppenberg, Ber. Dtsch. Chem. Ges. 34, 3264 (1901), (m.p. 143°C)] are dissolved in 250 ml acetonitrile. After addition of 66 g (0.48 mole) of powdered potassium carbonate, the mixture is stirred for half an hour at 40 to 50°C, and 75 g (0.4 mole) diethylthionophosphoric acid ester chloride are then added dropwise to the reaction mixture at this temperature. The reaction is mildly exothermic. To complete the reaction, the mixture is heated to 40°C for 3 hours; after this, it is allowed to cool, the reaction mixture is poured into water, and the separated oil is taken up in benzene. The benzene solution is washed once with a 2N solution of sodium hydroxide, then with water until there is a neutral reaction, and finally it is dried over sodium sulphate. After the solvent has been distilled off, there remain behind 81 g (77.2% of theory) of 0,0-diethyl- 0-[3-methylpyridazine-(6)-yl]-thionophosphoric acid ester in the form of a dark-red, undistillable oil with the refractive index $n_D^{21} = 1.5139$.

|  | N | P | S |
|---|---|---|---|
| Calc. for $C_9H_{15}N_2O_3PS$ (molecular weight 262.3): | 10.68%; | 11.81%; | 12.23%; |
| Found: | 10.64%; | 12.09%; | 12.33%. |

EXAMPLE 6

In a manner analogous to that of Example 5 the following compounds can be prepared:

| Formula | Physical properties |
|---|---|
| (4) 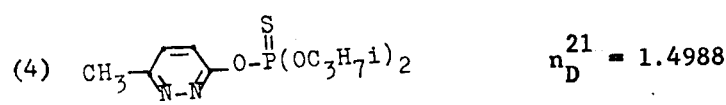 | $n_D^{21}$ = 1.4988 |
| (5) 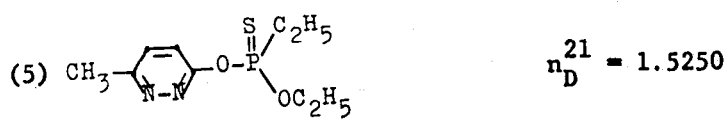 | $n_D^{21}$ = 1.5250 |
| (6) 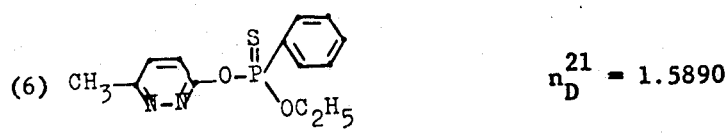 | $n_D^{21}$ = 1.5890 |
| (2) 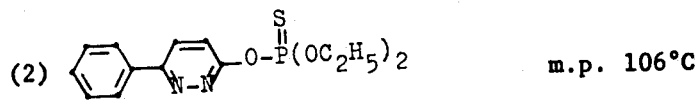 | m.p. 106°C |
| (3) 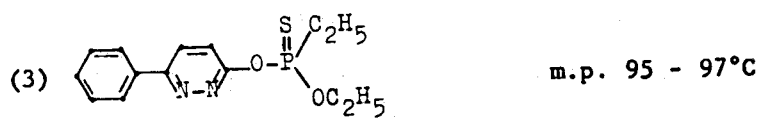 | m.p. 95 - 97°C |
| (7) 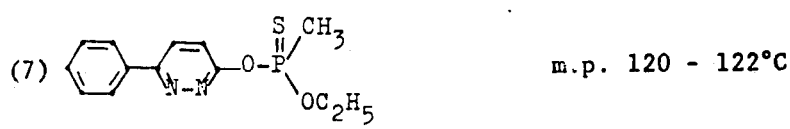 | m.p. 120 - 122°C |

It will be realized that all of the foregoing compounds contemplated by the present invention possess the desired selective pesticidal, especially arthropodicidal, i.e. insecticidal or acaricidal, properties for combating insects and acarids, and that such compounds have a low phytotoxicity and a correspondingly low mammalian toxicity.

As may be used herein, the terms "arthropod", "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Pyridazinothionophosphoric (-phosphonic) acid esters of the general formula

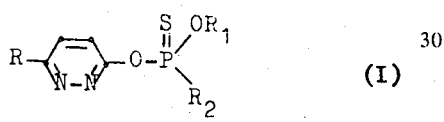

in which
  R is a lower alkyl or phenyl radical,
  $R_1$ is a branched or straight-chain lower alkyl radical, and
  $R_2$ is a branched or straight-chain lower alkoxy or alkyl or phenyl radical.

2. Compounds according to claim 1 in which R is a methyl or phenyl radical, $R_1$ is an alkyl radical with 1-4 carbon atoms, and $R_2$ is an alkyl radical with 1-4 carbon atoms, or an alkoxy radical of 1 to 4 carbon atoms or a phenyl radical.

3. Compounds according to claim 2 in which $R_1$ is an ethyl or propyl radical and $R_2$ is a methyl, ethyl, ethoxy, propoxy or phenyl radical.

4. Compound according to claim 1 wherein such compound is O,O-diethyl-O-[3-phenylpyridazine-(6)-yl]-thionophosphoric acid ester of the formula

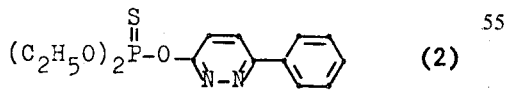

5. Compound according to claim 1, wherein such compound is O-ethyl-O-[3-phenylpyridazine-(6)-yl]-ethane-thionophosphonic acid ester of the formula

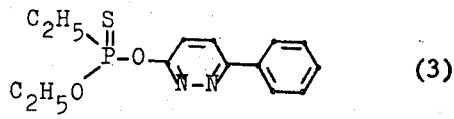

6. Compound according to claim 1, wherein such compound is O,O-diethyl-O-[3-methylpyridazine-(6)-yl]-thionophosphoric acid ester of the formula

7. Compound according to claim 1, wherein such compound is O,O-diisopropyl-O-[3-methylpyridazine-(6)-yl]-thionophosphoric acid ester of the formula

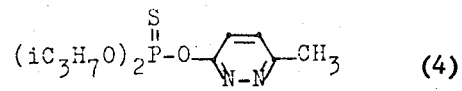

8. Compound according to claim 1, wherein such compound is O-ethyl-O-[3-methylpyridazine-(6)-yl]-ethane-thionophosphonic acid ester of the formula

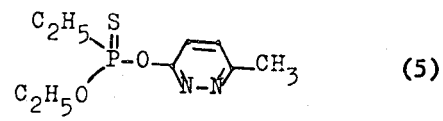

9. Compound according to claim 1, wherein such compound is O-ethyl-O-[3-methylpyridazine-(6)-yl]-benzene-thionophosphonic acid ester of the formula

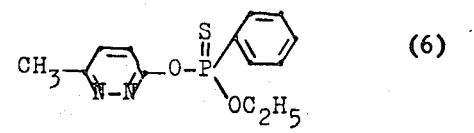

10. Compound according to claim 1, wherein such compound is O-ethyl-O-[3-phenylpyridazine-(6)-yl]-methane-thionophosphonic acid ester of the formula

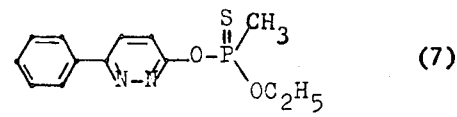

11. A compound having the formula

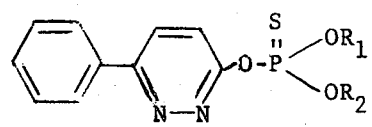

wherein $R_1$ and $R_2$ represent an alkyl group of 1-4 carbon atoms.

* * * * *